United States Patent [19]
Eaton et al.

[11] Patent Number: 5,542,820
[45] Date of Patent: Aug. 6, 1996

[54] ENGINEERED CERAMIC COMPONENTS FOR THE LEADING EDGE OF A HELICOPTER ROTOR BLADE

[75] Inventors: Harry E. Eaton, Woodstock; John E. Holowczak, South Windsor; William C. Reinfelder, Woodbridge, all of Conn.

[73] Assignee: United Technologies Corporation, Hartford, Conn.

[21] Appl. No.: 363,498

[22] Filed: Dec. 23, 1994

[51] Int. Cl.⁶ .................................................. F04D 29/18
[52] U.S. Cl. ........................................................ 416/224
[58] Field of Search ............................................ 416/224

[56] References Cited

U.S. PATENT DOCUMENTS

| | | | |
|---|---|---|---|
| 3,999,888 | 12/1976 | Zincone | 416/224 |
| 4,097,193 | 6/1978 | Brunsch et al. | 416/224 |
| 4,842,663 | 6/1989 | Kramer | 416/224 |
| 4,895,491 | 1/1990 | Cross | 416/224 |

FOREIGN PATENT DOCUMENTS

| | | | |
|---|---|---|---|
| 706001 | 4/1941 | Germany | 416/224 |
| 34499 | 2/1984 | Japan | 416/224 |
| 1110217 | 4/1968 | United Kingdom | 416/224 |

*Primary Examiner*—John T. Kwon
*Attorney, Agent, or Firm*—Terrance J. Radke

[57] ABSTRACT

An engineered ceramic component for the leading edge of a rotor blade provides enhanced erosion protection therefor. In one embodiment, the engineered ceramic component includes a strain isolator member, an aerodynamic ceramic member, a first adhesive bond layer, and a second adhesive bond layer. The strain isolator member, which is operative to minimize strain transfer between the rotor blade infrastructure and the aerodynamic ceramic member, is configured so that inner mold line surface thereof is complementary to outer mold line surface of the rotor blade infrastructure. The aerodynamic ceramic member, which is operative to provide enhanced erosion protection for the respective leading edge of the rotor blade, is configured so that the outer mold line surface thereof defines the aerodynamic configuration of the respective leading edge and the inner mold line surface is complementary to the outer mold line surface of the strain isolator member. The aerodynamic ceramic member is fabricated from an engineered ceramic material, which are defined in the present context as ceramic materials having a hardness greater than 1200 kg/mm² and an average flexural strength equal to or greater than 40 ksi. The first adhesive bond layer is operative to bond the strain isolator member to the rotor blade infrastructure and the second adhesive bond layer is operative to bond the aerodynamic ceramic member to the strain isolator member. In another embodiment, the engineered ceramic member includes the aerodynamic ceramic member described hereinabove and a thick adhesive layer. The thick adhesive layer is operative to minimize strain transfer between the rotor blade infrastructure and the aerodynamic ceramic member and to bond the aerodynamic ceramic member in combination with the rotor blade infrastructure.

23 Claims, 5 Drawing Sheets

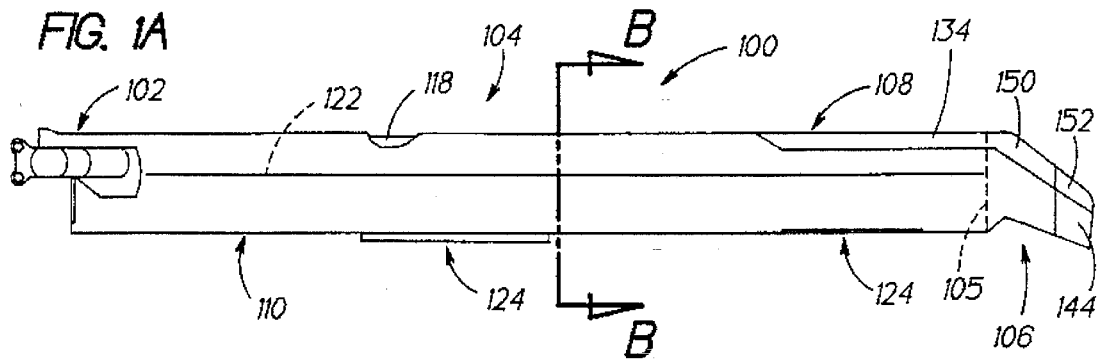
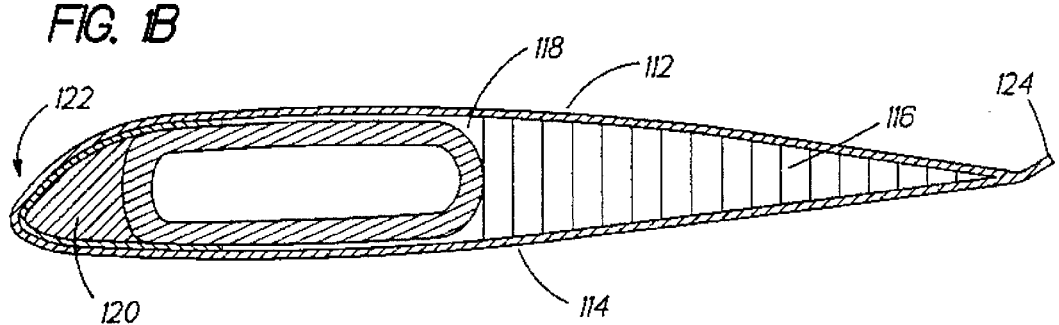
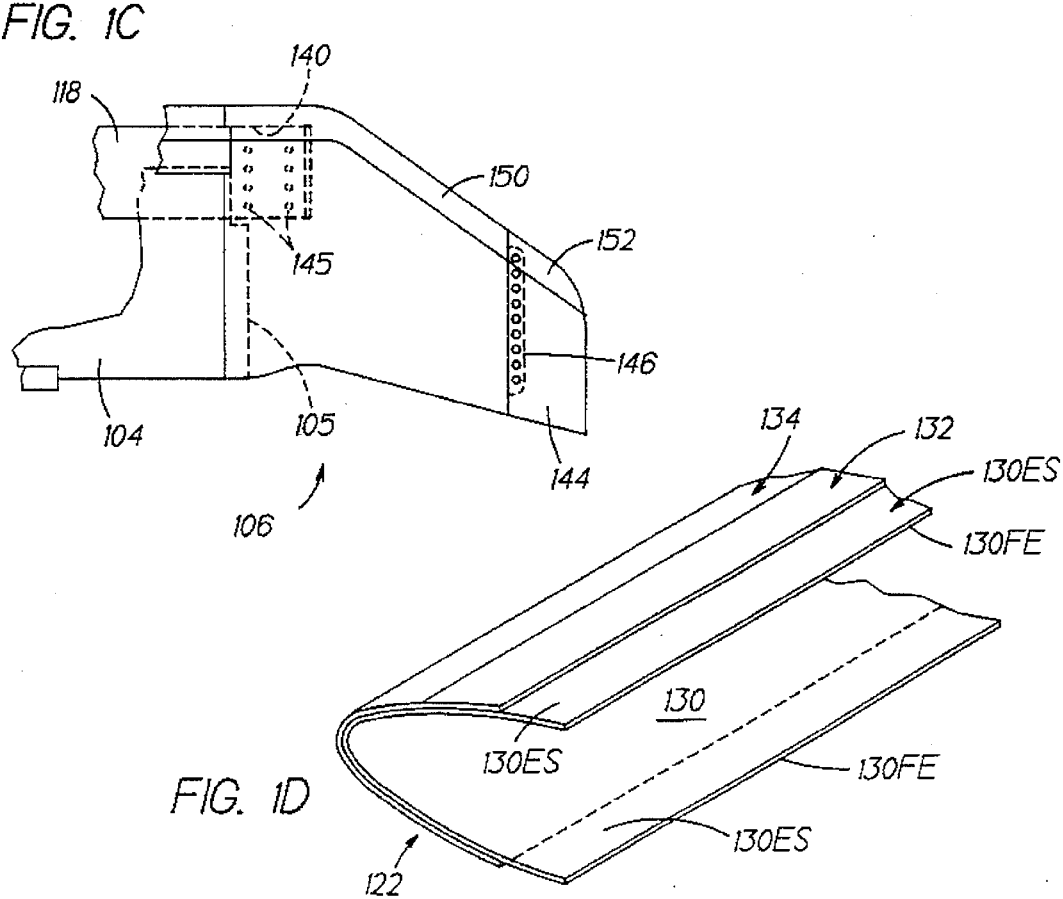

ENGINEERED CERAMIC COMPONENTS FOR THE LEADING EDGE OF A HELICOPTER ROTOR BLADE

TECHNICAL FIELD

The present invention relates to helicopter rotor blades, and more particularly, to engineered ceramic components for the leading edge of a helicopter rotor blade to enhance the erosion resistance thereof.

BACKGROUND OF THE INVENTION

Helicopter rotor assemblies, and in particular the rotor blades thereof, are subjected to a variety of operational forces—aerodynamic, inertial, and centrifugal. In particular, rotor blades must be designed to accommodate various dynamic loads such as bending loads, both flapwise (out-of-plane) and chordwise (in-plane), axial loads (centrifugal), and torsional loads (pitch). Such dynamic loads subject the rotor blade to varying degrees of stresses and strains.

In addition to the operational loads to which helicopter rotor blades are subjected, the rotor blades are also subjected to a wide variety of environmental conditions during helicopter flight operations. Rotor blades that are capable of maintenance-free operation for up to several thousand hours in a non-abrasive environment may be negatively affected when operated in an environment that includes abrasive particulate matter, e.g., sand. Experience has shown that rain and/or sand particles that impinge upon the leading edges of rotating rotor blades may have an adverse effect thereon by causing erosion wear of the leading edges. Erosion wear is of particular concern at the outboard end of the rotor blades due the higher rotational velocities thereof (the rotational speed at a given span point of the rotor blade is directly proportional to the radial distance from the rotor hub) wherein the relative impact velocities of rain and/or sand particles are significantly higher. The erosion rate, $E_r$, is proportional to velocity, V, according to an exponential relationship such as $E_r=f(V^n)$ where n ranges from 2.25 to 2.50.

Several different techniques have been explored to increase the erosion resistance of the leading edges of helicopter rotor blades. One technique used by the Sikorsky Aircraft Division of United Technologies Corporation has been the incorporation of ductile metal leading edge caps as an integral part of the rotor blade. More specifically, nickel leading edge caps are net shaped to a leading edge configuration by electroforming and adhesively bonded to the outboard end of the substrate, e.g., composite, comprising the rotor blade. Nickel leading edge caps provide good wear resistance protection against rain drop impacts encountered during helicopter flight operations.

However, as experience in Desert Storm revealed, nickel leading edge caps experienced undesired erosion wear when subjected to operations in a sand particle environment such as a desert. Not only were the nickel leading edge caps subjected to erosion wear as a result of forward flight through sand storms, but nickel leading edge caps were also subjected to erosion wear as a result of hover operations, e.g., take-offs, landings, due to particulate sand motion caused by rotor blade vortices, i.e., downwash. Sand erosion wear of the nickel leading edge caps eventually lead to the need to replace such caps to maintain the desirable flight characteristics of the rotor blades. However, inasmuch as the nickel leading edge caps comprise an integral part of the rotor blade, i.e., such caps are adhesively bonded to the composite infrastructure, replacement of the eroded nickel edge caps is not a "field level" repair. Rather, eroded rotor blades are removed from the helicopter and the nickel leading edge caps thereof replaced at a "depot level" maintenance facility. This can result in undesired downtime for the affected helicopter.

To reduce the erosion wear of the nickel leading edge caps of rotor blades due to sand particle impacts, a sacrificial material may be applied to the leading edges of rotor blades. Typically, the sacrificial material is an elastomeric material such as polyurethane. While an elastomeric sacrificial coating does not provide the erosion resistance characteristics of a ductile metal such as nickel, i.e., erosion occurs at a higher rate, an elastomeric sacrificial coating does provide some advantages. The elastomeric sacrificial coating may be applied to the leading edges of rotor blades as a tape. As such, a worn elastomeric sacrificial coating may be routinely replaced at the field level by stripping off the worn tape and replacing it with new tape, thereby significantly reducing helicopter downtime. Further, the cost of elastomeric sacrificial tape coatings is significantly less than nickel leading edge caps. Moreover, erosion wear effects on elastomeric sacrificial tapes are readily observable through visual inspection.

While the use of elastomeric sacrificial tape in conjunction with rotor blades having nickel leading edge caps significantly extends the useful life of the nickel leading edge caps with respect to the effects of sand particle erosion, the maintenance cycle time for replacement of worn elastomeric sacrificial tape makes the use of such tape a less than optimal solution to sand particle erosion. Moreover, an adverse downside was discovered when rotor blades having the leading edges thereof coated with elastomeric sacrificial tape were subjected to rain particle impacts after a minimal exposure to sand particle erosion. Under such circumstances, the useful erosion protection lifetime of elastomeric sacrificial tape was significantly reduced.

A need exists to provide enhanced erosion wear protection for the leading edges of rotor blades, both main and tail rotor. Such erosion wear protection should be effective in both sand and water particulate environments, i.e., significantly reduced erosion wear rate or high erosion resistance. Such erosion wear protection should be able to accommodate the stressed environment of a helicopter rotor blade, i.e., the torsional, flapwise, and chordwise bending loads experienced by a rotor blade during flight operations.

DISCLOSURE OF THE INVENTION

One object of the present invention is to provide an engineered ceramic component for the leading edge of a helicopter rotor blade that provides enhanced erosion protection in water and solid particulate environments.

Another object of the present invention is to provide an engineered ceramic component that includes a strain isolator member that is designed to minimize strain transfer from the rotor blade infrastructure to the aerodynamic ceramic member.

A further object of the present invention is to provide an engineered ceramic component that includes an aerodynamic ceramic member fabricated from an engineered ceramic material having an average flexural strength equal to or greater than 40 ksi.

One more object of the present invention is to provide an engineered ceramic component that includes an aerodynamic ceramic member fabricated from an engineered ceramic material having a hardness greater than 1200 kg/mm$^2$.

These and other objects of the present invention are achieved by one embodiment of an engineered ceramic component for a helicopter rotor blade that comprises a strain isolator member having an outer mold line surface, a first adhesive bond layer for bonding the strain isolator member in combination with the helicopter rotor blade infrastructure, an aerodynamic ceramic member having an outer mold line surface that defines the aerodynamic configuration of the respective leading edge of the helicopter rotor blade and an inner mold line surface that is complementary to the outer mold line surface of the strain isolator member, the aerodynamic ceramic member being fabricated from an engineered ceramic material having a hardness greater than 1200 kg/mm$^2$ and an average flexural strength equal to or greater than 40 ksi, and a second adhesive bond layer for bonding the aerodynamic ceramic member in combination with the strain isolator member.

Another embodiment of an engineered ceramic component comprises a thick layer of adhesive material and an aerodynamic ceramic member having an outer mold line surface that defines the aerodynamic configuration of the respective leading edge of the helicopter rotor blade. The aerodynamic ceramic member is fabricated from an engineered ceramic material having a hardness greater than 1200 kg/mm$^2$ and an average flexural strength equal to or greater than 40 ksi. The adhesive material layer is operative to minimize strain transfer between the rotor blade infrastructure and the aerodynamic ceramic member and to provide the bond the aerodynamic ceramic member in combination with the rotor blade infrastructure.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 1A is a top plan view of an exemplary main rotor blade for a helicopter.

FIG. 1B is a cross-sectional view of the main rotor blade of FIG. 1A taken along line 1B—1B thereof.

FIG. 1C is an enlarged top plan view of the replaceable anhedral tip portion of the main rotor blade of FIG. 1A.

FIG. 1D is a partial perspective view of a leading edge sheath for the main rotor blade of FIG. 1A.

BEST MODE FOR CARRYING OUT THE INVENTION

Figure 2:
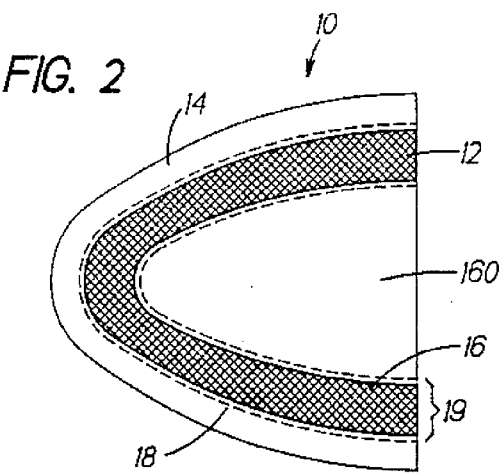
FIG. 2 is a cross-sectional view of an engineered ceramic component according to the present invention for the leading edge of a helicopter rotor blade.

Referring now to the drawings wherein like reference characters identify corresponding or similar elements throughout the several views, FIGS. 1A–1D illustrate an exemplary main rotor blade 100, more specifically, a growth main rotor blade for a helicopter such as the UH-60 helicopter manufactured by the assignee of the present invention. The main rotor blade 100 comprises an inboard segment 102 configured for mounting the main rotor blade 100 to the helicopter rotor hub assembly (not shown), an intermediate segment 104, and a replaceable tip segment 106 (reference numeral 105 in FIG. 1A identifies the demarcation between the outboard end of the intermediate segment 104 and the replaceable tip segment 106). The inboard, intermediate, and tip segments 102, 104, 106 in combination define the span of the main rotor blade 100. The main rotor blade 100 has a leading edge 108 and a trailing edge 110, which in combination define the chord of the main rotor blade 100.

The inboard and intermediate segments 102, 104 of the main rotor blade 100 are fabricated from upper and lower composite skins 112, 114 that define the upper and lower aerodynamic surfaces of the main rotor blade 100, respectively, a honeycomb core 116, a spar 118, one or more counterweights 120, and a leading-edge sheath 122. Adjustable trim tabs 124 (two for the illustrated embodiment) extend rearwardly from the trailing edge 110. The composite skins 112, 114 are prefabricated components formed from several plies of prepreg composite material of a type know to those skilled in the art, e.g., for the described embodiment woven fiberglass material embedded in a suitable resin matrix. The upper and lower skins 112, 114 are bonded to the honeycomb core 116. The honeycomb core 116 is fabricated of material of a type typically used in aerospace applications, e.g., for the described embodiment NOMEX® (NOMEX is a registered trademark of E. I. du Pont de Nemours & Co., Wilmington, Del. for aramid fibers or fabrics) and functions as a low weight, structural stiffening member between the upper and lower composite skins 112, 114.

The spar 118 is a prefabricated component and functions as the primary structural member of the main rotor blade 100, reacting the torsional, bending, shear, and centrifugal dynamic loads developed in the rotor blade 100 during operation of the helicopter. The spar 118 of the described embodiment is a composite spar formed from unidirectional laminates comprised of high and low modulus fibers and crossply laminates comprised of high modulus fibers. The unidirectional laminates are interposed with the crossply laminates to define upper and lower sidewall regions of the composite spar. End portions of the crossply laminates define the forward and aft conic regions of the composite spar, and are arranged to form structural joints and slip plane interfaces therein. End portions of the unidirectional laminates extend into transition subregions of the forward and aft conic regions. Further details of the composite spar 118 may be found in the commonly-owned, co-pending PCT patent application Ser. No. PCT/US94/09967, filed 31 Aug. 1994 entitled FIBER REINFORCED COMPOSITE SPAR FOR A ROTARY WING AIRCRAFT AND METHOD OF MANUFACTURE THEREOF. While the embodiment of the main rotor blade 100 described herein incorporates a composite spar 118, one skilled in the art will appreciate that helicopter rotor blades may be fabricated with a metallic spar member, e.g., a titanium spar.

One or more counterweights 120 are adhesively bonded to the composite spar 118 to statically, and dynamically balance the main rotor blade 100. The counterweights 120 are fabricated from less dense to more dense materials, e.g., foam, tungsten, and lead, respectively, for the described embodiment, in the spanwise direction from the inboard segment 102 out to the replaceable tip segment 106 to provide the necessary weight distribution for statically and dynamically balancing the rotor blade 100. The upper and lower composite skins 112, 114, the honeycomb core 116, the spar 118, and the counterweights 120 in combination define a main rotor blade subassembly.

The leading edge sheath 122, which is illustrated in greater detail in FIG. 1D, is a prefabricated hybrid component fabricated from composite materials and abrasion-resistive materials. The sheath 122 has a generally C-shaped configuration that defines the leading edge 108 of the main rotor blade 100 from the inboard end of the inboard segment 102 to the outboard end of the intermediate segment 104. The sheath 122 comprises one or more plies 130 of prepreg composite material, e.g., woven fiberglass material embedded in a suitable resin matrix for the described embodiment, that define the inner mold line (IML) of the leading edge sheath 122, a first abrasion strip 132, and a second abrasion strip 134. For the described embodiment of the main rotor blade 100, only an outboard portion of the leading edge sheath 122, i.e., corresponding to the outboard end of the intermediate segment 104, includes the first and second abrasion strips 132, 134 inasmuch as it is the outboard portion of the main rotor blade 100 that experiences the bulk of abrasion effects (velocity effects are proportional to the span station of the main rotor blade 100). The first abrasion strip 132 is fabricated from titanium and the second abrasion strip 134 is fabricated from nickel for the described embodiment of the leading edge sheath 122. The titanium strip 132 with the nickel strip 134 overlay is adhesively bonded to the prepreg composite plies 130 to form the leading edge sheath 122. Exposed segments 130ES of the prepreg composite plies 130 facilitate adhesive bonding of the leading edge sheath 122 in combination with the main rotor blade subassembly to form the main rotor blade 100. The exposed segments 130ES include finished edges 130FE (a method and apparatus for defining the finished edges 130FE of the leading-edge sheath 122 are described in commonly-owned, co-pending U.S. patent application Ser. No. 08/275,557, filed 15 Jul. 1994, entitled AN EOP SCRIBE DEVICE, that are formed to facilitate the proper integration of the leading edge sheath 122 in bonded combination with main rotor blade subassembly. The leading edge sheath 122 is removable to facilitate replacement thereof (the leading edge sheath 122 is removable at the OEM level). The leading edge sheath 122, and in particular the titanium strip 132 and the nickel strip 134 overlay, provides abrasion protection for the leading edge 108 of the main rotor blade 100. The leading edge sheath 122 also provides control of airfoil tolerances of the main rotor blade 100.

The replaceable tip segment 106 of the described embodiment of the main rotor blade 100 has a defined configuration that comprises a rearward sweep, taper, and anhedral which in coactive combination are operative to produce an increase in lift distribution over the span of the main rotor blade 100. Such a tip configuration redirects the tip trailing edge vortex and displaces such vortex so that it produces minimal interference on the trailing main rotor blade. The replaceable tip segment 106 comprises upper and lower composite skins bonded in combination with the honeycomb core. With reference to FIG. 1C, a recess 140 is formed in the honeycomb core of the replaceable tip segment 106, the recess 140 having dimensions slightly greater than the external dimensions of the spar 118. An adhesive material such as epoxy film adhesive is applied to the walls defining the recess 140 and the spar 118 so that the replaceable tip segment 106 is bonded to the intermediate segment 104. In addition, fasteners 142, e.g., threaded fasteners, may be used to secure the replaceable tip segment 106 in combination with the intermediate segment 104. The replaceable tip segment 106 is removable at the depot level, which greatly facilitates repair or replacement thereof.

The described embodiment of the main rotor blade 100 further includes a composite tip cap 144, e.g., graphite fibers embedded in a resin matrix, that is secured in combination with the outboard end of the replaceable tip segment 106 by means of fasteners 146. Alternatively, the tip cap 144 may be fabricated from a metallic material such as titanium. The tip cap 144 is removable at the field level, which minimizes the time and costs associated with replacement thereof. The replaceable tip segment 106 includes an abrasion strip 150 and the composite tip cap 144 includes an abrasion strip 152. The abrasion strips 150, 152 in combination define the leading edge of the replaceable tip segment 106. For the described embodiment, the abrasion strips 150, 152 are formed from nickel.

The abrasion strips 134, 150, 152 provide excellent wear resistance against water droplet, e.g., rain, impacts at the speeds encountered during helicopter flight operations, but are subject to erosion as a result of particulate impacts, typically in the form of sand. Depending upon the erosion wear rate(s) of the abrasion strips 134, 150, 152, replacement procedures (and, concomitantly, helicopter downtime) for the abrasion strips 134, 150, 152 range from relatively simple to relatively complex (and regardless of the complexity, replacement of abrasion strips 134, 150, 152 drives up the helicopter operating costs). For example, replacement of the tip cap abrasion strip 152 is relatively simple since it has been designed for field level replacement while replacement of the abrasion strip 134 of the intermediate segment 104 is relatively complex since it must be accomplished at the OEM's facility (replacement of the abrasion strip 150 of the replaceable tip segment 106 is intermediate in complexity since it can be accomplished at the depot level).

One short term solution to the erosion problem described in the preceding paragraph, such solution extending the time between replacements for the various abrasion strips 134, 150, 152, is the application of an elastomer such as polyurethane as an overlay, e.g., tape, on the abrasion strips 134, 150, 152. The elastomeric overlay functions as a sacrificial covering for the abrasion strips 134, 150, 152. The elastomeric overlay does not provide the same degree of erosion resistance as the abrasion strips 134, 150, 152, but such elastomeric overlays are readily replaceable in the field by stripping away the old tape and applying new tape. Moreover, the erosion capability of the elastomeric overlay may be readily determined by routine visual inspection.

While elastomeric-coated abrasion strips 134, 150, 152 provide the main rotor blade 100 with a significant degree of protection against the abrading effects of sand and water, these abrasion strips 134, 150, 152 are still susceptible to the eroding effects of a hostile environment of sand and/or water over a period of time. In addition to examining the effects of impacting sand on the life of the abrasion strips 134, 150, 152, the inventors have also examined erosion mechanisms due to the impact of water droplets on the abrasion strips 134, 150, 152. Three mechanisms were determined to cause the erosion effects due to water droplet impacts: (1) the water hammer effect; (2) the jet effect; and (3) the ram effect.

The water hammer effect is the primary water erosion mechanism affecting the structural integrity of the leading edge 108 of the main rotor blade 100, defining the force (in terms of pressure) exerted against the leading edge 108 of the main rotor blade 100 as a result of the initial impact of the water droplet thereagainst. The water hammer effect Pwh is defined by $(V_i)(C_o)(\rho)$ where $V_i$ is the relative speed of the water droplet, $C_o$ is the speed of sound in water, i.e., about 1500 m/s, and $\rho$ is the density of the water droplet. For a water droplet impacting a rotor blade at a speed of 500 mph (733 ft/sec or 223 m/s), the water hammer effect of the water droplet exerts a pressure force of approximately 334 mPa (47 ksi) against the rotor blade. This level of stress is sufficient to cause plastic deformation in low strength alloys and to cause fractures in low strength brittle ceramics. The jet effect defines the shearing force exerted against the leading edge 108 of the main rotor blade 100 as a result of the high velocity, low angle water jet created by the collapse of the impacting water droplet, i.e., the velocity of the leading edge of the collapsing water droplet falls below $C_o$. This water jet action is particularly effective at removing surface asperities and opening cracks in the substrate surface. For the example described immediately hereinabove, the water jet has a velocity of approximately 578 m/s. Finally, the ram effect defines the kinetic energy exerted against the leading edge 108 of the main rotor blade 100 as a result of the mass of the water droplet, i.e., $\rho(V_i)^2$. A better appreciation of the erosion effects as a result of water droplet impacts, and the concomitant need to mitigate the erosion effects of sand particulate impacts, led to the engineered ceramic components described in the following paragraphs.

A cross-sectional view of an exemplary embodiment of an engineered ceramic component 10 for the leading edge of a helicopter rotor blade is illustrated in FIG. 2. The engineered ceramic component 10 according to the present invention provides at least an order of magnitude improvement (see FIGS. 4A, 4B) in erosion resistance against both water droplets and particulate matter such as sand as compared to elastomeric coated or uncoated abrasion strips 134, 150, 152 of the type described hereinabove. As discussed in further detail hereinbelow, engineered ceramic components 10 can be fabricated to have configurations that allow such devices to replace one or more of the abrasion strips 134, 150, 152 of the type described hereinabove. As one skilled in the art will appreciate, the engineered ceramic components 10 according to the present invention can also be fabricated for use in combination with rotor blades incorporating other types of erosion protection devices, or for use in combination with rotor blades that do not incorporate erosion protection devices.

This embodiment of the engineered ceramic component 10 according to the present invention comprises a strain isolator member 12, an aerodynamic ceramic member 14, a first adhesive bond layer 16 for bonding the strain isolator member 12 to the infrastructure (identified by reference numeral 160 in FIG. 2) of a rotor blade, and a second adhesive bond layer 18 for bonding the aerodynamic ceramic member 14 to the strain isolator member 12. As used herein, the infrastructure 160 defines the structure of the rotor blade to which the engineered ceramic component 10 is bonded so that in combination the infrastructure 160 and the engineered ceramic component 10 define the corresponding aerodynamic configuration of the leading edge of the rotor blade. With reference to the embodiment of the main rotor blade 100 described hereinabove, the infrastructure 160 is the composite structural portion of the leading edge 108 of the main rotor blade 100, i.e., the outer portion of the intermediate segment 104, the replaceable tip segment 106, and/or the tip cap 144 of the replaceable tip segment 106. For example, the engineered ceramic component 10 according to the present invention can be configured to be bonded in combination with the composite plies 130 that form the leading edge sheath 122 described hereinabove, i.e., the engineered ceramic component 10 replaces the first and second abrasion strips 132, 134 described hereinabove. For such an embodiment, the strain isolator member 12 is bonded to the composite plies 130 by means of the first adhesive bond layer 16 and the aerodynamic ceramic member 14 is bonded to the strain isolator member 12 by means of the second adhesive bond layer 18. The composite plies 130, the strain isolator member 12 and the aerodynamic ceramic member 14 in bonded combination define a variant of the leading edge sheath described hereinabove which is subsequently bonded in combination with the main rotor blade subassembly described hereinabove. In another embodiment, the engineered ceramic component 10 can be configured to replace one or both of the abrasion strips 150, 152 described hereinabove. For this embodiment of the engineered ceramic component 10, the strain isolator member 12 is directly bonded to the composite skins forming the replaceable tip segment 106 and/or the tip cap 144 of the replaceable tip segment 106 by means of the first adhesive bond layer 16 and the aerodynamic ceramic member 14 is bonded to the strain isolator member 12 by means of the second adhesive bond layer 18.

The strain isolator member 12 of the engineered ceramic component 10 is operative to accommodate flexure between the ductile composite infrastructure 160 of the main rotor blade 100 and the substantially rigid aerodynamic ceramic member 14, i.e., to minimize strain transfer therebetween. The strain isolator member 12 is fabricated so that the inner mold line (IML) surface thereof is complementary to the outer mold line (OML) surface of the composite infrastructure 160. The strain isolator member 12 is fabricated from material having a low shear modulus and a large shear strain allowable to provide the desired strain attenuation characteristics. In addition, the strain isolator member 12 should have a relatively constant coefficient of thermal expansion over the environmental operating temperature range of the helicopter, e.g., −30° F. to 120° F.

To further enhance the strain attenuation characteristics of the strain isolator member 12, the strain isolator member 12 may be fabricated so as to contain a certain percentage by volume of voids, i.e., a predetermined porosity. For the described embodiment of the engineered ceramic component 10, the strain isolator member 12 is fabricated to have a porosity in the range of about 5 to about 75% by volume. Alternatively, the strain isolator member 12 may be fabricated with a microcolumnar configuration, i.e., individual columns of material, with voids surrounding the individual columns. For this embodiment of the strain isolator member 12, the material comprising the microcolumns comprises about 5 to about 75% by volume of the overall structure. In yet a further embodiment of the engineered ceramic component 10, the strain isolator member 12 is fabricated to include strain absorbing phases interspersed in the baseline material. In yet one more embodiment of the engineered ceramic component 10, the strain isolator member 12 is segmented, with each segment having a length (spanwise direction) within the range of 1 to 250 mils.

Figure 3A:
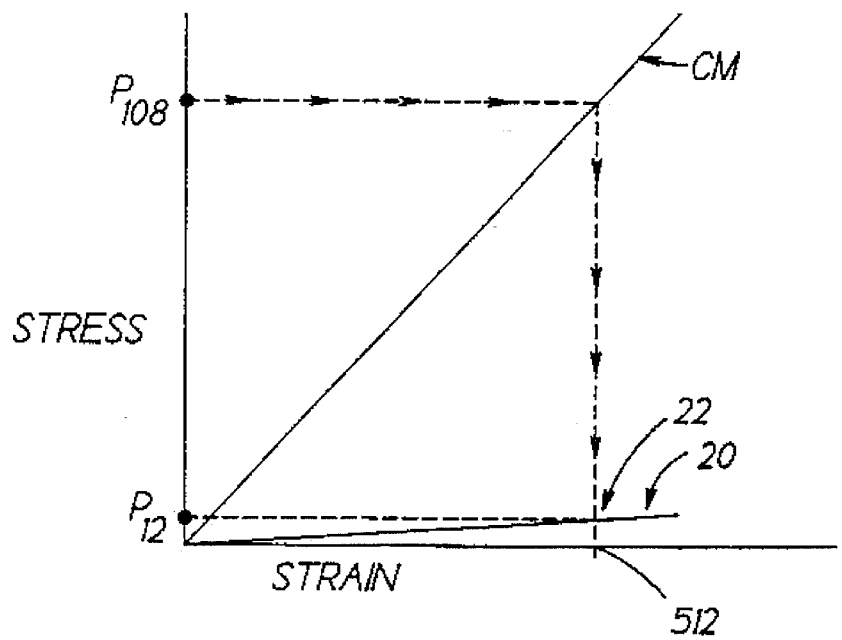
FIG. 3A is a stress-strain curve illustrating the loads and strains induced in the strain isolator member of the engineered ceramic component according to the present invention as a result of the torsional, bending, shear, and centrifugal loads developed in the corresponding rotor blade.
Figure 3B:
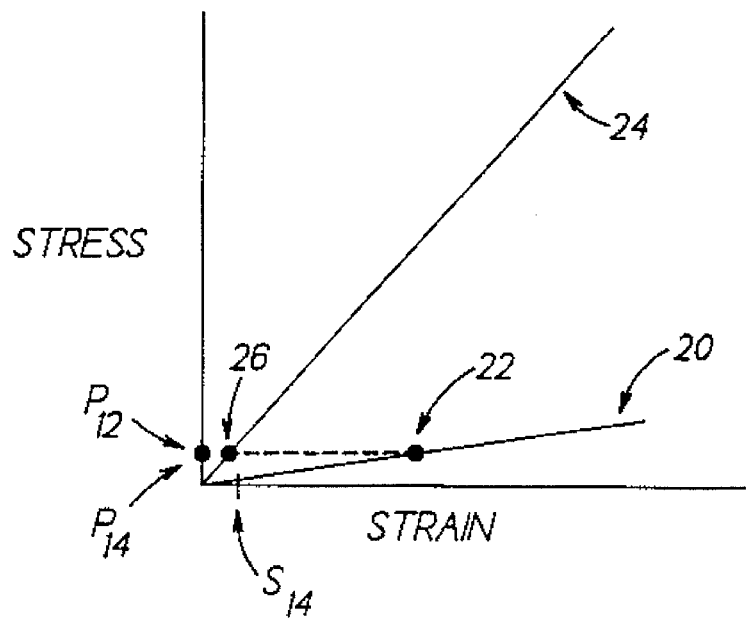
FIG. 3B is a complementary stress-strain curve illustrating the loads and strains induced in the aerodynamic ceramic member of the engineered ceramic component according to the present invention as a result of the loads and strains induced in the strain isolator member.

FIGS. 3A, 3B are stress-strain graphs illustrating the desired characteristics of the strain isolator member 12 of the engineered ceramic component 10 according to the present invention. Referring to FIG. 3A, the reference characters CM designate the stress strain curve of the composite infrastructure 160 of the main rotor blade 100 (for the embodiment described hereinabove, the composite plies 130 of the leading edge sheath 122) and reference numeral 20 designates the stress strain curve of the strain isolator member 12 fabricated from a material having a low shear modulus and a large shear strain allowable. The stress experienced by the leading edge 108 of the main rotor blade 100, due to the torsional, bending, shear, and centrifugal dynamic loads acting on the main rotor blade 100, is identified by reference character $P_{108}$. The load $P_{108}$ defines the strain induced in the strain isolator member 12 (identified by reference numeral 22). The strain induced in the strain isolator member 12, in turn, defines the load (identified by reference character $P_{12}$) acting on the strain isolator member 12. Referring to FIG. 3B wherein reference numeral 24 identifies the stress strain curve of the aerodynamic ceramic member 14, the load $P_{12}$ acting on the strain isolator member 12 defines the load and strain induced in the aerodynamic ceramic member 14 (identified by reference numeral 26). The load $P_{14}$ induced in the aerodynamic ceramic member 14 is equal in magnitude to the load $P_{12}$ induced in the strain isolator member 12. The strain induced in the aerodynamic ceramic member 14, as identified by reference character $S_{14}$, is significantly minimized with respect to the strain $S_{12}$ (see FIG. 3A) induced in the strain isolator member 12. Materials such as thermosetting and thermoplastic elastomers, and to a lesser degree, thermoplastic polymers such as polyurethane and epoxy resins, have utility in fabricating strain isolator members 12 for engineered ceramic components 10 according to the present invention.

The aerodynamic ceramic member 14 is operative: (1) to define the aerodynamic configuration of the respective leading edge 108 of the main rotor blade 100; and (2) to provide enhanced erosion resistance, with respect to both water and particulate environments, for the respective leading edge 108 of the main rotor blade 100. The aerodynamic ceramic member 14 is fabricated so that the OML surface thereof defines the aerodynamic configuration of the respective leading edge 108 and the IML surface is complementary to the OML surface of the strain isolator member 12. Conventional fabrication techniques such as sintering, casting plus sintering, or hot pressing may be utilized to form the aerodynamic ceramic member 14. For typical applications involving helicopter rotor blades, the aerodynamic ceramic member 14 is fabricated to have a thickness greater than 10 mils, and preferably within the range of greater than 10 mils to 1000 mils.

Engineered ceramics having utility in forming the aerodynamic ceramic member 14 of the present invention have a hardness greater than sand particles, i.e., nominally greater than 1200 kg/mm$^2$ so as to provide a low wear rate or high erosion resistance, and a minimum predetermined average flexural strength. The terminology "minimum average flexural strength" as used herein means a tensile strength as least as great as the water hammer impact force described hereinabove, i.e., $\geq$47 ksi. It should be appreciated, however, that the 47 ksi figure is the impact force generated by water droplets at the extreme tip of the rotor blade. As noted hereinabove, the impact force at points inboard of the extreme tip of the rotor blade will be lower as a result of the lower impact velocity of the water droplets. Therefore, the inventors have determined that engineered ceramics having an average flexural strength equal to or greater than 40 ksi are sufficient to achieve the objectives of the present invention. Representative examples of such high tensile strength engineered ceramics include zirconium oxide (tensile strengths in the range of 100–175 ksi), silicon aluminum oxynitrides or SiAlON (tensile strengths in the range of 100–120 ksi) such as Norton/TRW NT-451 (a yttrium-modified SiAlON or Sandvik 680 (a hot pressed SiAlON), silicon nitrides (tensile strengths in the range of 90–110 ksi) such as Garrett GN-10 (a yttrium-ytterbium modified $Si_3N_4$), Garrett/Allied Signal GS-44 (a sintered $Si_3N_4$), or Enceratek TSN-10 (a sintered $Si_3N_4$), titanium diboride (tensile strength of about 80 ksi), and silicon carbides (tensile strengths in the range of 40–75 ksi) such as Norton/TRW 235 (a SiSiC). Aluminum oxide, which has a tensile strength in the range of 20–50 ksi, may be suitable for some applications. Toughened materials such as whisker reinforced alumina, zirconia toughened alumina, and silicon carbide plus titanium carbide toughened alumina may also be utilized.

In addition to the foregoing mechanical characteristics, such engineered ceramics exhibit a density advantage of almost 3 to 1 over the baseline nickel material used in the erosion strips 134, 150, 152 described hereinabove. As a result of the density advantage provided by such engineered ceramics, the aerodynamic ceramic member 14 of the engineered ceramic component 10 may be approximately three times as thick as a comparable nickel erosion strip 134, 150, 152. Such an aerodynamic ceramic member 14 has a significantly enhanced useful life due to the increased thickness and the higher erosion resistance thereof. Alternatively, the aerodynamic ceramic member 14 may be fabricated with a thickness substantially equal to the comparable nickel erosion strip 134, 150, 152. Such an aerodynamic ceramic member 14 will possess an enhanced useful life greater than the comparable nickel erosion strip 134, 150, 152 due to the superior erosion resistance of the engineered ceramic material used to form the aerodynamic ceramic member 14. In addition, the overall weight of the main rotor blade 100 will be reduced in view of the lower density of the engineered ceramic material.

Adhesives of the type know to those skilled in the art are used to form the first and second adhesive bond layers 16, 18 of the engineered ceramic component 10. The adhesives selected for a particular application depend on the compositional characteristics of the leading edge infrastructure 160, the strain isolator member 12, and the aerodynamic ceramic member 14, respectively. The selected adhesive should provide a good bond between the elements to be bonded, i.e., the leading edge infrastructure 160 and the strain isolator member 12 and the strain isolator member 12 and the aerodynamic ceramic member 14. In addition, the selected adhesive should exhibit a low modulus in shear. The first and second adhesive bond layers 16, 18 have an exemplary thickness of about 10 mils. Scrim cloth or sized particulates, e.g., an inert material or pre-cured adhesive which has been crushed to size, may be incorporated in the adhesive material to achieve defined bond line thicknesses. Exemplary adhesive materials having utility in forming the first and second adhesive bond layers 16, 18 of engineered ceramic components 10 according to the present invention include Product Research 1592, Hy-Sol 9309, Hy-Sol 9359, and AF163-2.

The inventors have determined that some adhesive materials, e.g., Product Research 1592, possess shear modulus and shear strain allowable characteristics that are similar in magnitude to the strain isolator member 12 materials described hereinabove. Accordingly, in another embodiment of an engineered ceramic component 10 according to the present invention, a thick layer 19 (see FIG. 2) of such adhesive material may be substituted for the strain isolator member 12 and the first and second adhesive layers 16, 18 of the embodiment of the engineered ceramic component 10 described in the preceding paragraphs. The thick adhesive layer 19 has the characteristics of and performs the described functions of the strain isolator member 12 and the first and second adhesive layers 16, 18 as described hereinabove. The terminology "thick" as used herein refers to the adhesive layer 19 having sufficient depth so as to provide the same degree of strain transfer minimization between the rotor blade infrastructure 160 and the aerodynamic ceramic member 14 as does the strain isolator member 12 described hereinabove.

Figure 4A:
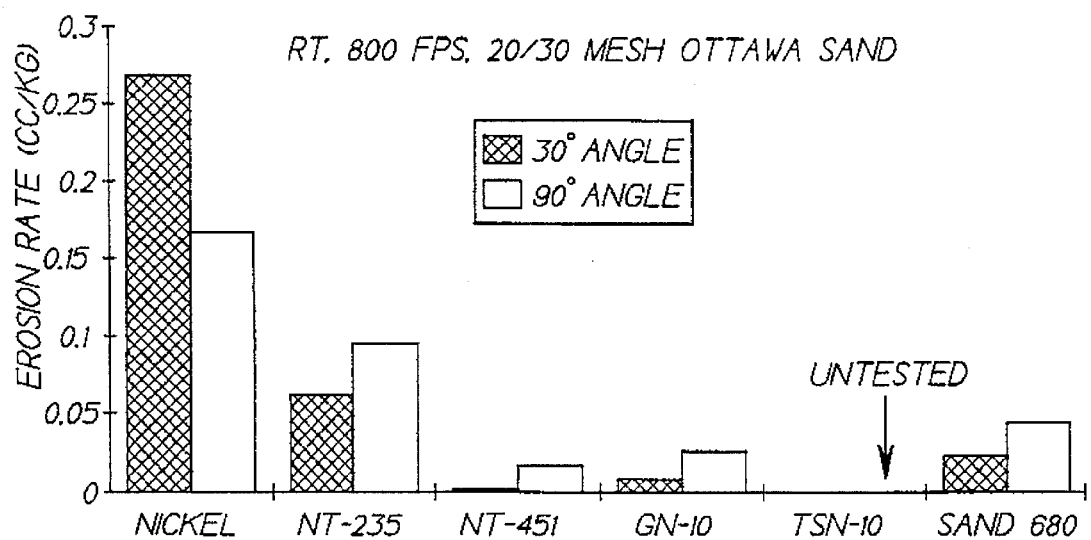
FIG. 4A is a graph comparing the erosion rates of engineered ceramic materials versus a baseline nickel material.
Figure 4B:
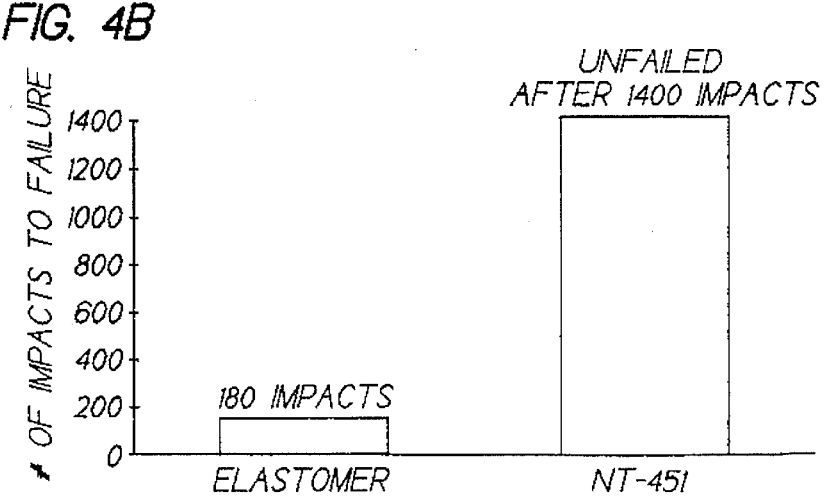
FIG. 4B is a graph comparing the erosion effects of water droplets on an engineered ceramic material versus an elastomeric material.

FIGS. 4A, 4B illustrate the relative efficacy, with respect to sand and water impacts, respectively, of one set of tests done with engineered ceramic materials versus nickel and elastomeric materials, respectively. As examination of FIG. 4A shows, engineered ceramic materials exhibit a markedly lower erosion rate than the baseline nickel material when subjected to sand particles. The effect of water impact testing is illustrated in FIG. 4B, and shows that a commercial elastomeric material, when subjected to rain erosion impacts under the stated conditions, failed after 160 impacts while the engineered ceramic material was unaffected after 1400 impacts. Other testing showed that some elastomeric materials, when exposed to a small degree of sand erosion prior to water droplet erosion, experienced reductions of about 80 to 90% in effective lifetimes against water droplet erosion. Some engineered ceramics that were machined to final form, which caused induced surface defects, experienced critical surface flaws when exposed to stress. Post-formation heat treatment, therefore, may be necessary for devices fabricated from engineered ceramic materials to correct such induced surface defects.

In another test, an engineered ceramic prototype device having an arcuate configuration (about 0.125 inches in thickness at the apex and about 0.050 inches at the opposed trailing edges) was fabricated from SiAlON, mounted on an arm (30 inch radius) of a whirl stand rig, and subjected to a sand environment (20/30 mesh Ottawa sand at a flow rate of 100 lbs/hr). The SiAlON prototype device covered the outboard portion of the arm and was subjected to sand impacts at the tip of approximately 720 ft/sec. The inboard portion of the arm was an exposed steel substrate and was subjected to sand impacts at the inboard tip of approximately 580 ft/sec. The test was terminated after fifteen minutes due to excessive damage of the exposed steel substrate. Progressively increasing damage with increasing radial position was observed in the exposed steel substrate. No erosion effects were observed in the ceramic prototype device.

Figure 5A:
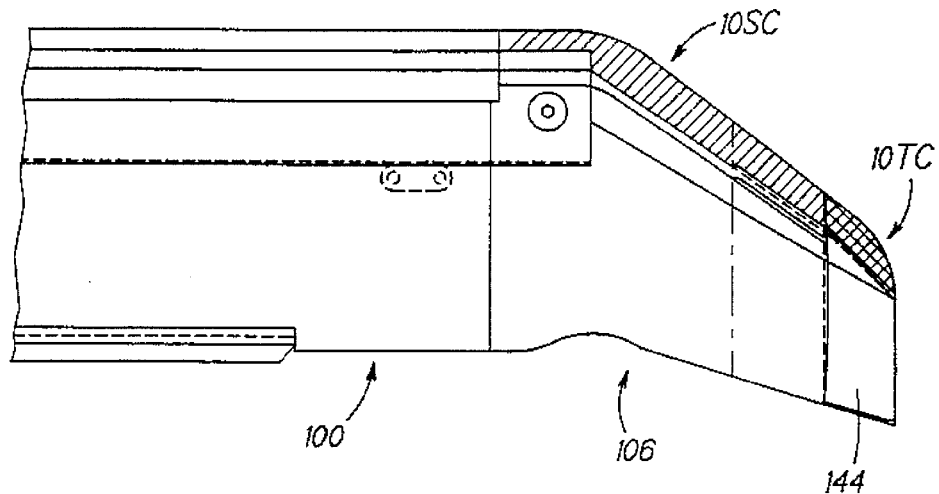
FIG. 5A is a partial top plan view of the main rotor blade of FIG. 1 illustrating exemplary embodiments of engineered ceramic components according to the present invention.
Figure 5B:
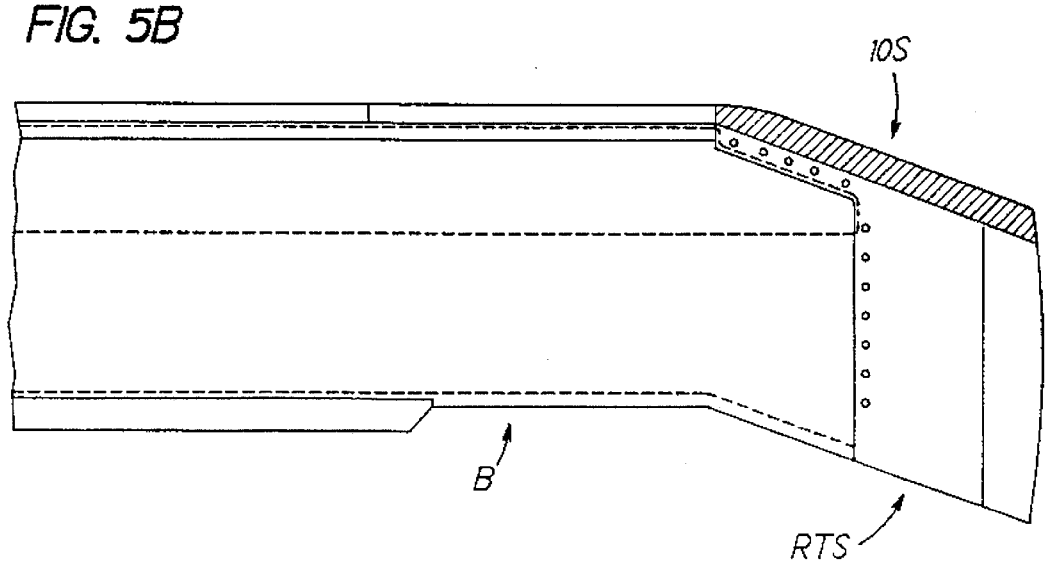
FIG. 5B is a partial top plan view of a main rotor blade illustrating another embodiment of an engineered ceramic component according to the present invention.
Figure 5C:
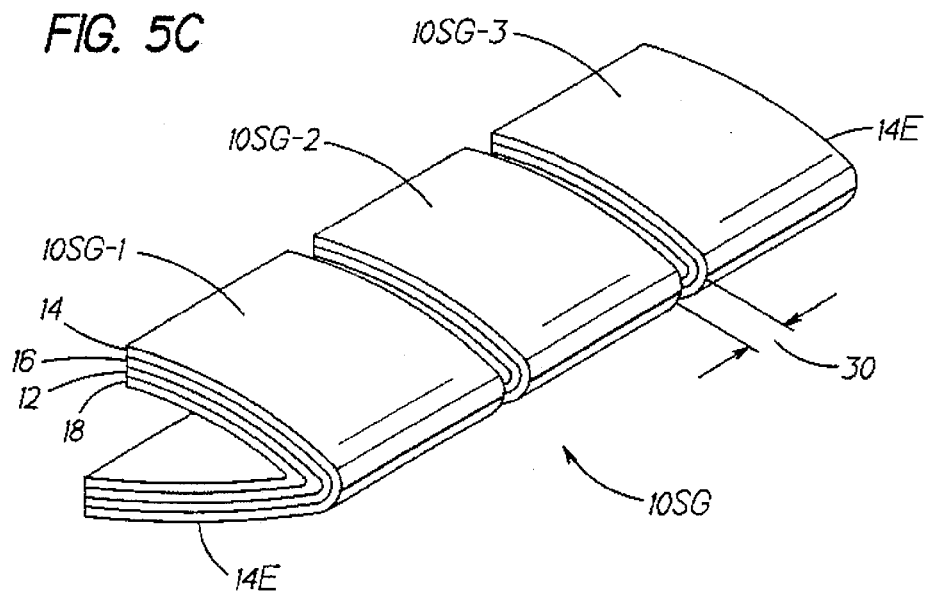
FIG. 5C is a perspective view of a further embodiment of an engineered ceramic component according to the present invention.

FIGS. 5A–5C illustrate exemplary embodiments of engineered ceramic components 10 according to the present invention for specific applications. FIGS. 5A–5B depict several embodiments of engineered ceramic components 10 configured for the tip segments of helicopter main rotor blades. FIG. 5A illustrates the main rotor blade 100 described hereinabove. Embodiments of the engineered ceramic components 10SC, 10TC are bonded in combination with the leading edge of the replaceable tip segment 106 and the tip cap 144 of the replaceable tip segment 106, respectively, of the main rotor blade 100 to provide enhanced erosion protection therefor. FIG. 5B illustrates the main rotor blade B currently incorporated in the UH-60 BLACK HAWK® (BLACK HAWK is a registered trademark of United Technologies Corporation), the main rotor blade B including a removable tip segment RTS. The engineered ceramic component 10S is bonded in combination with the leading edge of the removable tip segment RTS of the main rotor blade B to provide enhanced erosion protection therefor. The aforedescribed engineered ceramic components 10S, 10SC, 10TC may be fabricated as integral, i.e., unitary, structures inasmuch as the tip segments of the main rotor blades 100, B are low strain areas. Fabrication of the engineered ceramic components 10S, 10SC, 10TC as integral structures greatly simplifies the fabrication process, and, in addition, simplifies the integration of the engineered ceramic components 10S, 10SC, 10TC in combination with the respective tip segments.

Figure 6:
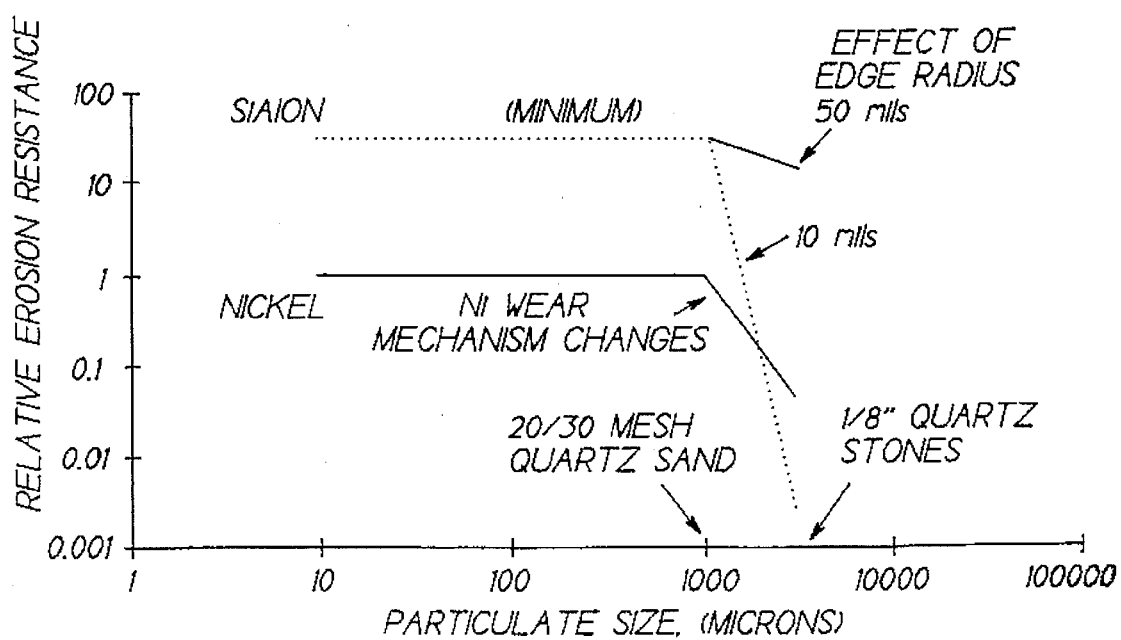
FIG. 6 is a graph demonstrating the relative erosion protection provided by SiAlON and nickel materials.

FIG. 5C illustrates a further embodiment of an engineered ceramic component 10SG according to the present invention. This engineered ceramic component 10SG is configured as individual segments (identified as 10SG-1, 10SG-2, and 10SG-3 in FIG. 5C) that are bonded in combination with the leading edge of the main rotor blade to provide enhanced erosion protection therefor. This particular embodiment is intended for leading edge applications wherein the leading edge is subjected to high strains as a result of the torsional, bending, shear, and centrifugal loads induced in the main rotor blade, e.g., the corresponding leading edge 108 of the outboard portion of the intermediate segment 104 of the main rotor blade 100 described hereinabove. The individual segments 10SG-1, 10SG-2, and 10SG-3 comprising the engineered ceramic component 10SG accommodate such high strains more readily than a unitary engineered ceramic component. Preferably, each of the individual segments, e.g., 10SG-1, 10SG-2, and 10SG-3, comprising the engineered ceramic component 10SG has a length (spanwise direction) within range of one to six inches. Each of the individual segments 10SG-1, 10SG-2, and 10SG-3 is separated from adjacent individual segments by a predetermined gap. The predetermined gap is sized to preclude any mechanical interaction between adjacent individual segments while concomitantly minimizing particulate intrusions and impacts against the underlying infrastructure 160. The allowable dimensions of the predetermined gap, identified by reference numeral 30 in FIG. 5C, between adjacent segments is about one mil. Preferably, the aerodynamic ceramic members 14 comprising each of the individual segments 10SG-1, 10SG-2, and 10SG-3 of the engineered ceramic component 10SG have radiused edges 14E to minimize the effects of impacting particles. The inventors determined that right angled edges were more prone to fracturing or erosion wear as a result of particulate impact than were radiused edges, and particularly, that such erosion wear was exacerbated with increasing particulate size. FIG. 6 illustrates this particular concern (and also provides a comparison between erosion protection capabilities of SiAlON and nickel materials). The radiused edges 14E should have a radius of at least 10 mils, and preferably on the order of 50 mils. As an examination of FIG. 6 shows, the erosion wear rate of radiused edges 14E having a radius of 50 mils, when subjected to particulates greater than 1000 microns in size, is considerably less than the erosion wear rate of radiused edges 14E having a radius of 10 mils.

A variety of modifications and variations of the present invention are possible in light above teachings. For example, the embodiments of the engineered ceramic components described hereinabove are utilized in combination with a helicopter main rotor blade. One skilled in the art will appreciate that the engineered ceramic components according to the present invention also have utility for use in combination with helicopter tail rotor blades. The engineered ceramic components according to the present invention also have utility for leading edge erosion protection of engine propellers. It is therefore to be understood that, within the scope of the appended claims, the present invention may be practiced otherwise than as specifically described hereinabove. And, specifically, it is to be understood that the use of the terminology "rotor blade" in the appended claims encompasses an engine propeller.

What is claimed is:

1. An engineered ceramic component for a rotor blade, comprising:
   a strain isolator member having an outer mold line surface;
   a first adhesive bond layer for bonding said strain isolator member in combination with the rotor blade infrastructure;
   an aerodynamic ceramic member having an outer mold line surface that defines the aerodynamic configuration of the respective leading edge of the rotor blade and an inner mold line surface that is complimentary to the outer mold line surface of said strain isolator member, said aerodynamic ceramic member being fabricated from an engineered ceramic material having a hardness greater than 1200 kg/mm$^2$ and an average flexural strength equal to or greater than 40 ksi; and
   a second adhesive bond layer for bonding said aerodynamic ceramic member in combination with said strain isolator member;
   said strain isolator member being fabricated from a material having a low shear modulus and a large shear strain allowable wherein said strain isolator member is operative to provide maximal strain attenuation between said aerodynamic ceramic member and the rotor blade infrastructure.

2. The engineered ceramic component of claim 1 wherein said aerodynamic ceramic member has a thickness greater than 10 mils.

3. The engineered ceramic component of claim 1 wherein said strain isolator member and said aerodynamic ceramic member are each formed as a unitary member.

4. The engineered ceramic component of claim 1 wherein said strain isolator member is formed as a unitary member and further wherein said aerodynamic ceramic member is formed as a plurality of individual segments, each individual segment being separated from an adjacent individual segment by a predetermined gap.

5. The engineered ceramic component of claim 4 wherein each individual segment has a length within the range of about one inch to about six inches.

6. The engineered ceramic component of claim 4 wherein said predetermined gap is about one rail.

7. The engineered ceramic component of claim 4 wherein each of said individual segments comprising said aerodynamic ceramic member has radiused edges.

8. The engineered ceramic component of claim 4 wherein each said radiused edge of said individual segments has a radius of fifty mils.

9. The engineered ceramic component of claim 1 wherein said engineered ceramic material of said aerodynamic ceramic member is a silicon aluminum oxynitride based ceramic.

10. The engineered ceramic component of claim 1 wherein said engineered ceramic material of said aerodynamic ceramic member is a zirconium oxide based ceramic.

11. The engineered ceramic component of claim 1 wherein said engineered ceramic material of said aerodynamic ceramic member is a silicon nitride based ceramic.

12. The engineered ceramic component of claim 1 wherein said engineered ceramic material of said aerodynamic ceramic member is a whisker reinforced alumina based ceramic.

13. The engineered ceramic component of claim 1 wherein said engineered ceramic material of said aerodynamic ceramic member is a zirconia toughened alumina based ceramic.

14. The engineered ceramic component of claim 1 wherein said engineered ceramic material of said aerodynamic ceramic member is a silicon carbide, titanium carbide toughened alumina based ceramic.

15. The engineered ceramic component of claim 1 wherein said engineered ceramic material of said aerodynamic ceramic member is a silicon carbide based ceramic.

16. The engineered ceramic component of claim 1 wherein said engineered ceramic material of said aerodynamic ceramic member is a titanium diboride based ceramic.

17. The engineered ceramic component of claim 1 wherein said strain isolator member is fabricated from a thermosetting elastomer.

18. The engineered ceramic component of claim 1 wherein said strain isolator member is fabricated from a thermoplastic elastomer.

19. The engineered ceramic component of claim 1 wherein said strain isolator member is fabricated to have a predetermined porosity, said predetermined porosity being within the range of 5 to 75% by volume.

20. The engineered ceramic component of claim 1 wherein said strain isolator member is fabricated to have a microcolumnar structure, said microcolumnar structure comprising 5 to 75% by volume of said strain isolator member.

21. The engineered ceramic component of claim 1 wherein said strain isolator member is fabricated to include strain absorbing phases.

22. The engineered ceramic component of claim 1 wherein said strain isolator member is fabricated as a plurality of individual segments, each of said individual segments having a length with the range of 1 to 250 mils.

23. An engineered ceramic component for a rotor blade, comprising:
   a thick layer of adhesive material; and
   an aerodynamic ceramic member having an outer mold line surface that defines the aerodynamic configuration of the respective leading edge of the rotor blade, said aerodynamic ceramic member being fabricated from an engineered ceramic material having a hardness greater than 1200 kg/mm$^2$ and an average flexural strength equal to or greater than 40 ksi;
   said adhesive material layer being operative to provide maximal strain attenuation between said aerodynamic ceramic member and the infrastructure of the rotor blade infrastructure and for bonding said aerodynamic ceramic member in combination with the rotor blade infrastructure.

* * * * *